US008276833B2

(12) United States Patent
Cheng et al.

(10) Patent No.: US 8,276,833 B2
(45) Date of Patent: Oct. 2, 2012

(54) HANDHELD AND MULTI-SECTION WATER DISTRIBUTOR

(75) Inventors: Mengfeng Cheng, Taichung (TW); Changwen Zhang, Shen Zen (CN)

(73) Assignee: Globe Union Industrial Corp., Taichung (TW)

( * ) Notice: Subject to any disclaimer, the term of this patent is extended or adjusted under 35 U.S.C. 154(b) by 176 days.

(21) Appl. No.: 12/939,951

(22) Filed: Nov. 4, 2010

(65) Prior Publication Data

US 2012/0111973 A1 May 10, 2012

(51) Int. Cl.

*B05B 1/30* (2006.01)
*F16K 31/53* (2006.01)
*F16K 31/44* (2006.01)

(52) U.S. Cl. ..... 239/447; 239/436; 239/443; 239/581.1; 239/581.2; 239/582.1; 251/230

(58) Field of Classification Search .................. 239/390, 239/391, 396, 436, 443, 444, 446–449, 525, 239/581.1, 581.2, 582.1; 251/215, 230
See application file for complete search history.

(56) References Cited

U.S. PATENT DOCUMENTS

| | | | | |
|---|---|---|---|---|
| 7,341,239 | B2 * | 3/2008 | Hodel et al. | 251/230 |
| 2011/0024516 | A1 * | 2/2011 | Li et al. | 239/11 |
| 2011/0226876 | A1 * | 9/2011 | Xu | 239/562 |

* cited by examiner

*Primary Examiner* — Darren W Gorman

(57) ABSTRACT

A handheld and multi-section water distributor contains a body including an inlet end, an outlet end, and a chamber defined between the inlet end and the outlet end; a pressing element including a push segment and a press segment integrally connected on a bottom end of the push segment; a plugging member including a plug segment and a retaining segment integrally extending from a bottom end of the plug segment; the plug segment being formed in a cone shape and extending downward decreasingly to define an outer sealing wall so as to closely engage with the inner sealing wall of the closing room; the retaining segment including a number of protrusions arranged around a bottom end thereof to be retained in the recesses respectively; a resilient element fixed between the inflow room and a top fence of the plugging member to push the plugging member.

17 Claims, 20 Drawing Sheets

HANDHELD AND MULTI-SECTION WATER DISTRIBUTOR

BACKGROUND OF THE INVENTION

1. Field of the Invention

The present invention relates to a handheld and multi-section water distributor.

2. Description of the Prior Art

A showering equipment, such as a shower head, is apply a rotary-disc watering distributor to shift a water level, but the rotary-disc watering distributor is fixed on an outlet end of the shower head, according a size of the outlet end of the shower head has to be increased that is not easy to be held during operation. Besides, the rotary-disc watering distributor is merely used on an outlet end of the shower head without being fixed on other components of the shower head.

To overcome above-mentioned problem, a pressed watering distributor is developed and includes a disk-shaped water distributing member to be acted by a water pressure and a spring to engage with an opposite disc. The disk-shaped water distributing member includes a plurality of first holes communicating with each other and is pushed by a pressing element to rotate, such that the first holes of the water distributing member are controlled to communicate with second holes of the opposite disc, shifting water level.

However, such a pressed watering distributor still has the following defects.

An inlet direction and an outlet direction of the pressed watering distributor are perpendicular to the disc. To arrange the second holes of the disc, a size of the water distributing member has to be increased, thereby obtaining a larger watering area pressed by the water flow. Furthermore, a structure of the watering distributor is limited, therefore at least one orifice to release pressure can not be formed on the water distributing member, so a user has to press the pressing element forcefully that can not achieve a force saving purpose.

Likewise, when desiring to obtain more shifting levels, such as up to six-section shifting levels, the size of the water distributing member has to be increased greatly.

The present invention has arisen to mitigate and/or obviate the afore-described disadvantages.

SUMMARY OF THE INVENTION

The primary object of the present invention is to provide a handheld and multi-section water distributor that is capable of overcoming the shortcomings of the conventional water distributor.

To obtain the above objectives, a handheld and multi-section water distributor provided by the present invention contains:

a body including an inlet end, an outlet end, and a chamber defined between the inlet end and the outlet end; the chamber including an inflow room disposed on an upper side thereof, an operating room fixed on a lower side thereof, and a closing room defined between the inflow room and the operating room; the closing room being formed in a cone shape and extending downward decreasingly; the inlet end of the body including an entering channel extending toward a first internal face of the inflow room to communicate with the inflow room; the outlet end including al least two outflow channels, each extending toward a closed inner wall of the chamber to communicate with the chamber; a bottom wall of the operating room including a hole disposed thereon so that the operating room communicates with an outer environment through the hole; a second internal face of the operating room including a plurality of toothed blocks extending radially thereal-ong, and between any two adjacent toothed blocks being defined a recess, and each toothed block including a ratchet plane fixed on a top end thereof;

a pressing element including a push segment and a press segment integrally connected on a bottom end of the push segment and extending out of the operating room from the hole of the operating room; the push segment including a plurality of sliding projections radially extending from a peripheral side thereof to be retained in the recesses respectively, and each sliding projection including a first inclined face formed on a top end thereof to match with a tilted angle of the ratchet plane of the toothed block;

a plugging member including a plug segment and a retaining segment integrally extending from a bottom end of the plug segment; the plug segment being formed in a cone shape and extending downward decreasingly to define an outer sealing wall so as to closely engage with the inner sealing wall of the closing room of the body; the outer sealing wall further including at least one flowing tunnel to communicate with the outflow channel of the body; the retaining segment including a number of protrusions arranged around a peripheral side of a bottom end thereof to be retained in the recesses of the body respectively, and each protrusion including a third inclined face disposed on a bottom end thereof to be pushed by the first inclined face upward so as to disengage from the recess, and then the protrusion rotably sliding into an adjacent recess along the ratchet plane of the toothed block, retaining the protrusion in the recess;

a resilient element fixed between the inflow room and a top fence of the plugging member to push the plugging member.

DETAILED DESCRIPTION OF THE PREFERRED EMBODIMENTS

Figure 1:
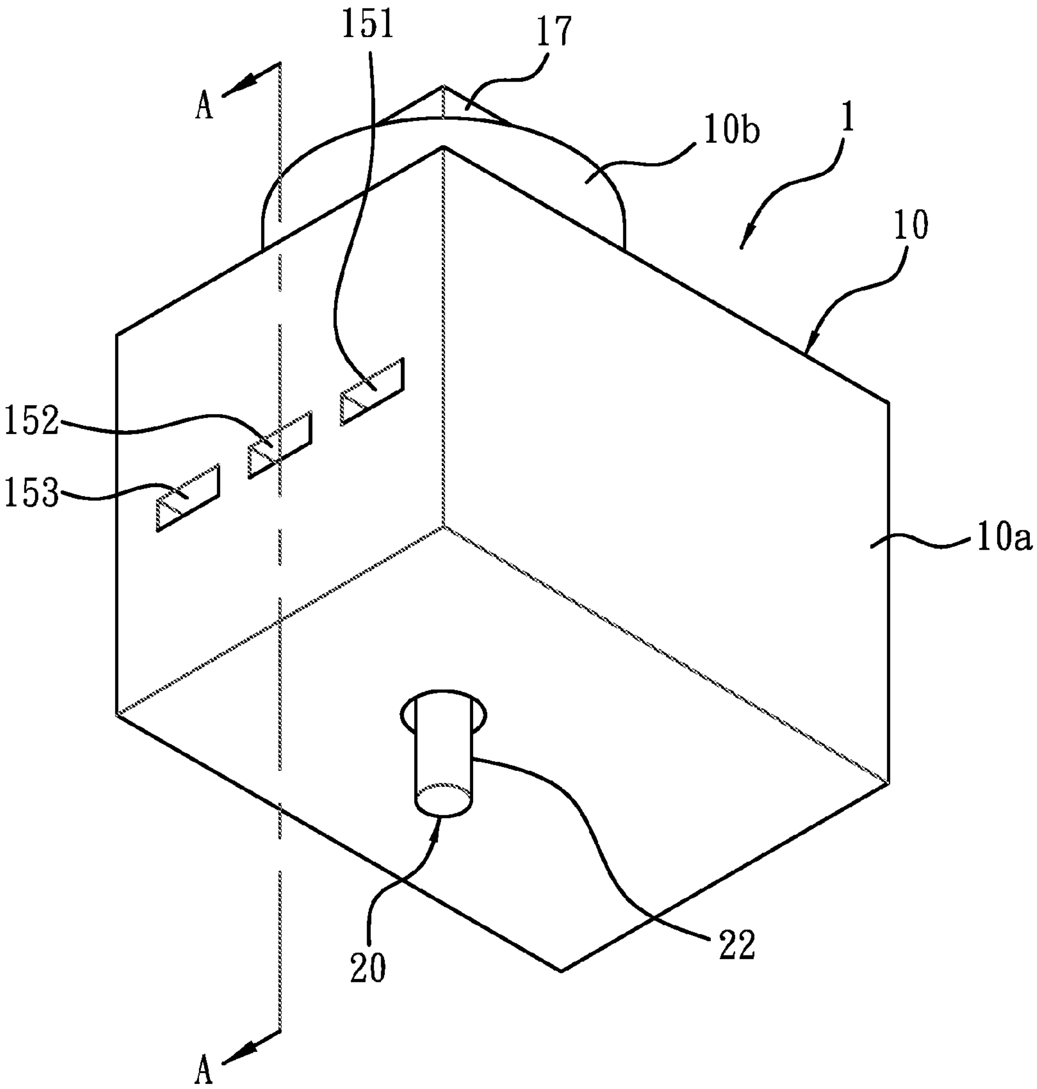
FIG. 1 is a perspective view showing the assembly of a handheld and multi-section water distributor according to a first embodiment of the present invention.
Figure 2:
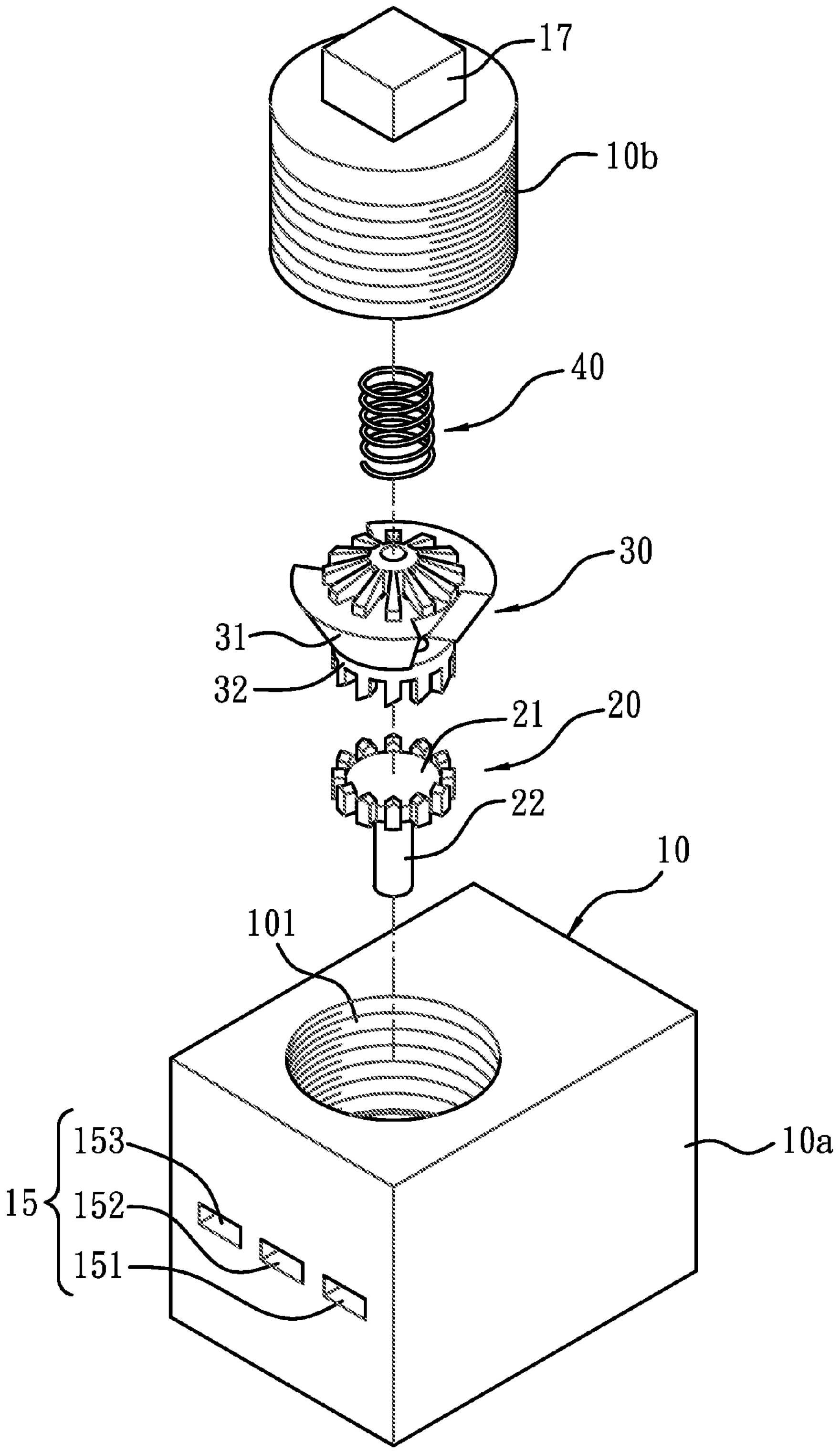
FIG. 2 is a perspective view showing the exploded components of the handheld and multi-section water distributor according to the first embodiment of the present invention.

The present invention will be clearer from the following description when viewed together with the accompanying drawings, which show, for purpose of illustrations only, the preferred embodiment in accordance with the present invention.

Referring to FIGS. 1-5, a handheld and multi-section water distributor 1 according to a first embodiment of the present invention comprises a body 10, a pressing element 20, a plugging member 30, and a resilient element 40.

Figure 6:
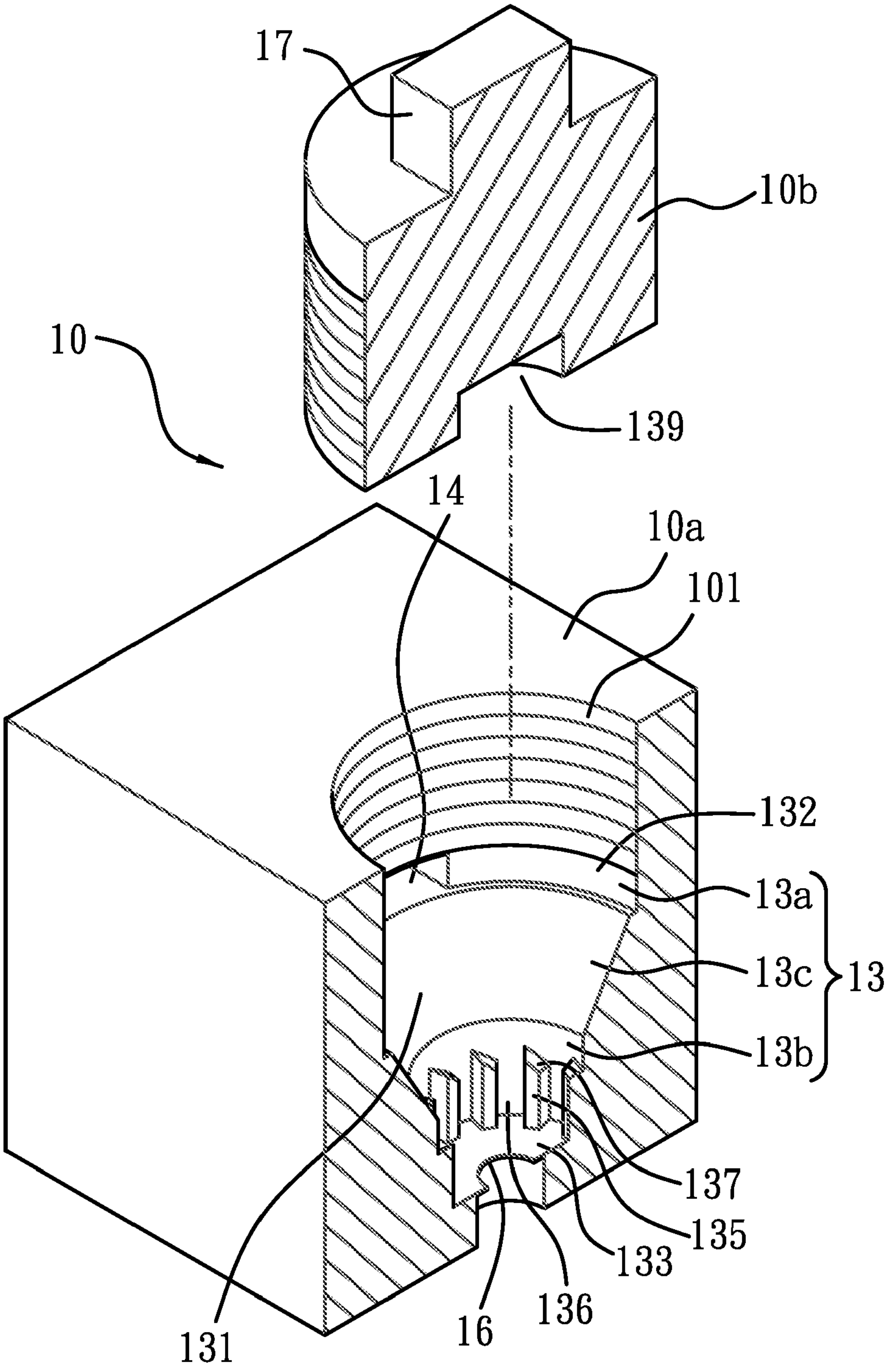
FIG. 6 is a cross-sectional perspective view showing the exploded components of a body of the handheld and multi-section water distributor according to the first embodiment of the present invention.
Figure 7:
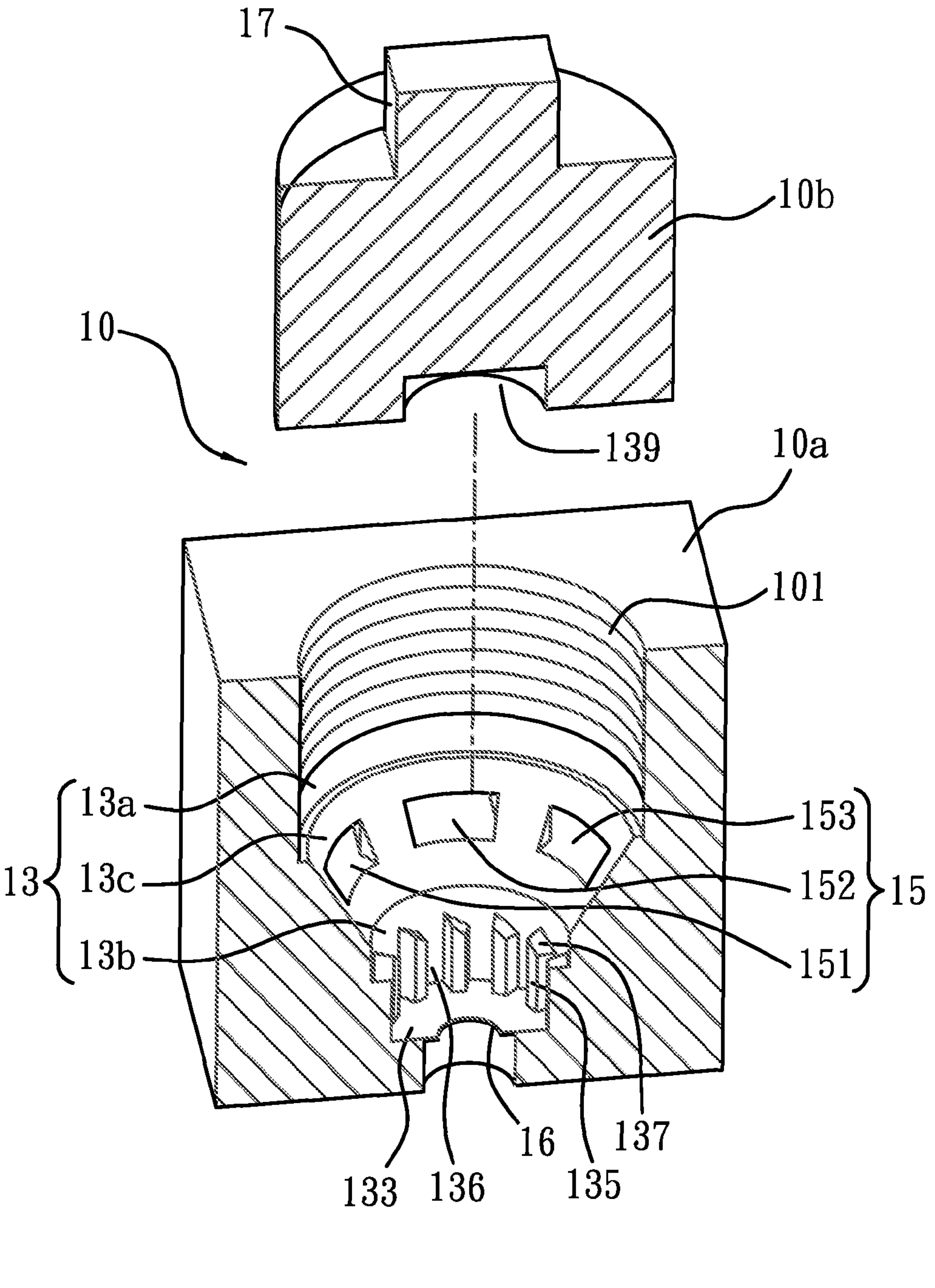
FIG. 7 is another cross-sectional perspective view showing the exploded components of the body of the handheld and multi-section water distributor according to the first embodiment of the present invention.
Figure 8:
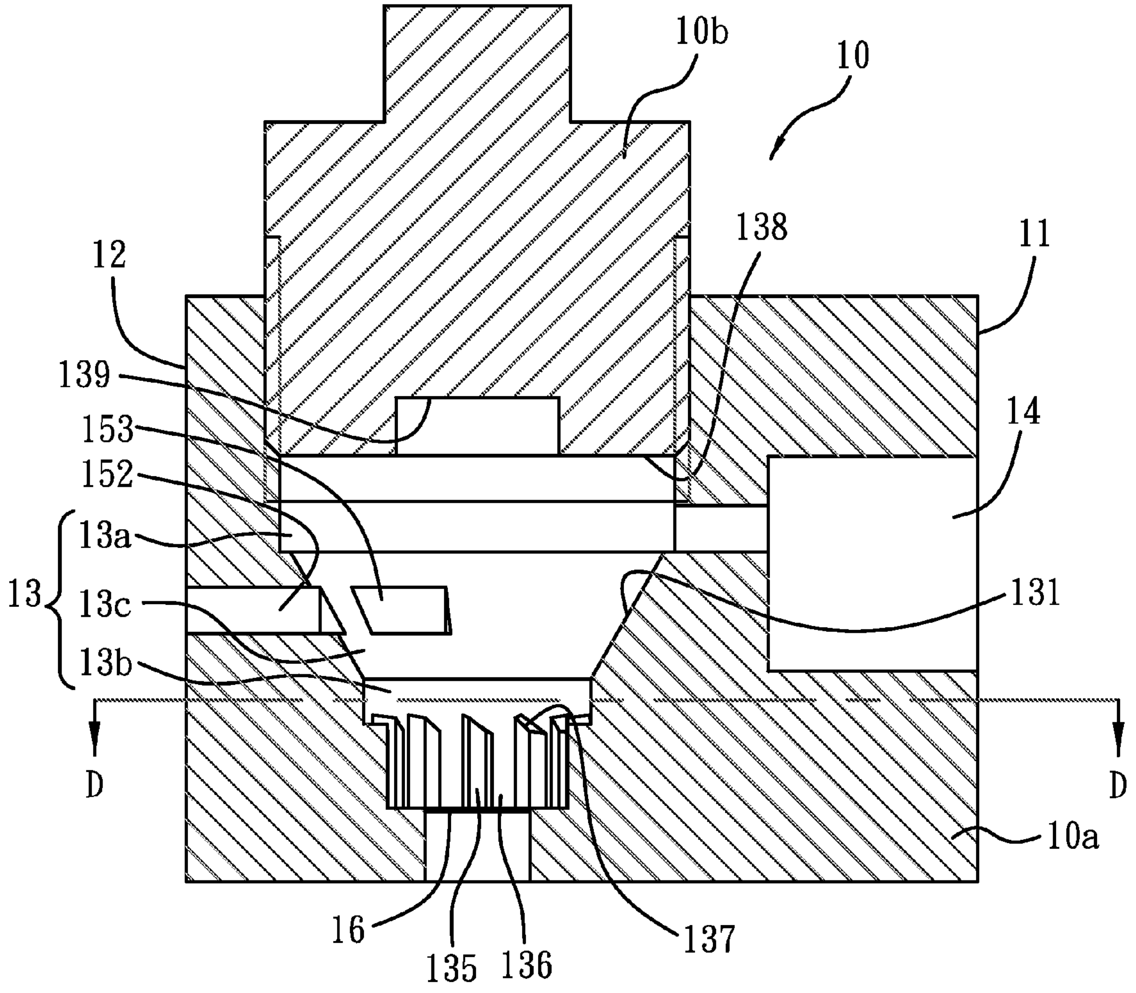
FIG. 8 is a cross sectional view showing the assembly of the handheld and multi-section water distributor according to the first embodiment of the present invention.

The body 10, as shown in FIGS. 6-8, includes an inlet end 11, an outlet end 12, and a chamber 13 defined between the inlet end 11 and the outlet end 12.

The chamber 13 includes an inflow room 13*a* disposed on an upper side thereof, an operating room 13*b* fixed on a lower side thereof, and a closing room 13*c* defined between the inflow room 13*a* and the operating room 13*b*.

The closing room 13*c* is formed in a cone shape, extends downward decreasingly, and includes an inner sealing wall 131 formed therein.

The inlet end 11 of the body 10 includes an entering channel 14 extending toward a first internal face 132 of the inflow room 13*a* to communicate with the inflow room 13*a* so that the first internal face 132 forms an entrance to flow water inward.

Figure 5:
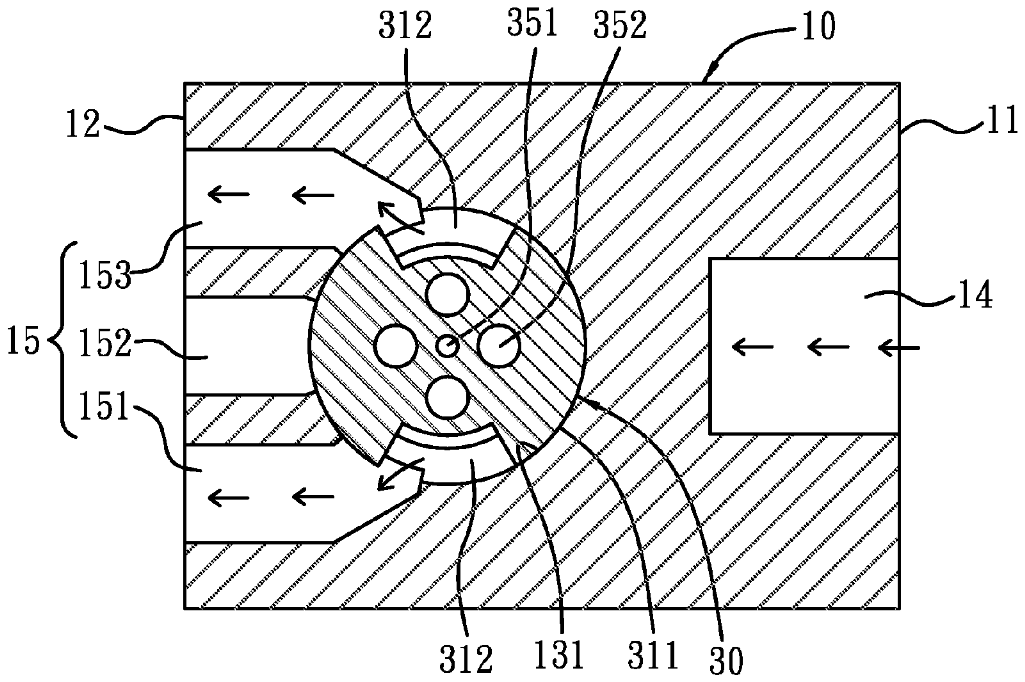
FIG. 5 is a cross sectional view taken along the line C-C of FIG. 3.

The outlet end 12 includes a plurality of outflow channels 15, each extending toward a closed inner wall 131 of the chamber 13 to communicate with the chamber 13. As illustrated in FIGS. 1, 5, 7, there are three outflow channels 15 provided in this embodiment, the three outflow channels 15 includes a first outflow channel 151, a second outflow channel 152, and a third outflow channel 153, wherein the first, the second, and the third outflow channels 151, 152, 153 include an exit to flow the water outward individually.

A bottom wall 133 of the operating room 13*b* includes a hole 16 disposed thereon as shown in FIGS. 6-8 so that the operating room 103 communicates with an outer environment through the hole 16.

Figure 9:
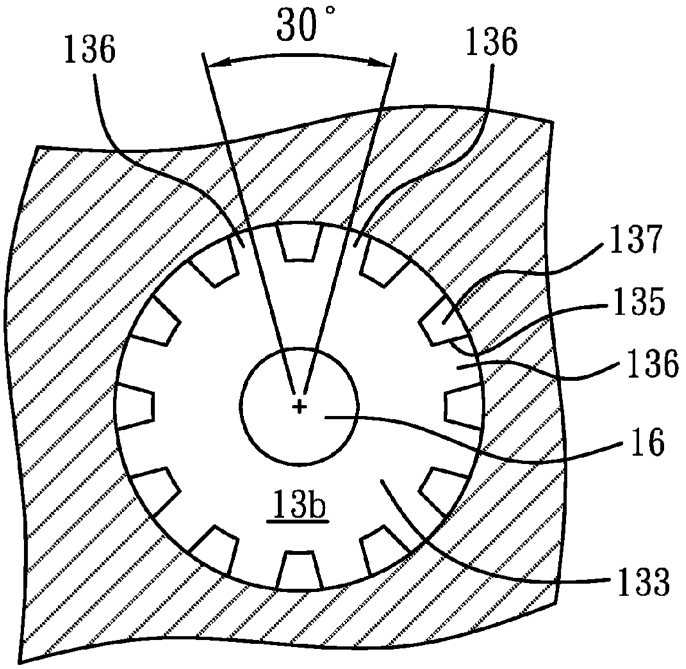
FIG. 9 is a partially cross sectional view taken along the line D-D of FIG. 8.

A second internal face 134 of the operating room 13*b* includes a plurality of toothed blocks 135 extending radially therealong and spaced apart from each other equally, wherein between any two adjacent toothed blocks 135 is defined a recess 136, and each toothed block 135 includes a ratchet plane 137 fixed on a top end thereof. In this embodiment, there are twelve toothed blocks 135 provided as illustrated in FIG. 9 so that twelve recesses 136 are generated, and an included angle formed between any two adjacent recesses 136 is 30 degrees to be served as a separated angle between two central lines of the any two adjacent recesses 136.

The body 10 is comprised of a seat 10*a* and a covering member 10*b* as shown in FIGS. 6-8; the seat 10*a* is a main part of the body 10 and includes an intake 101 with internal threads relative to the top end of the chamber 13, the covering member 10*b* is formed in a circular column shape and includes external threads arranged on an outer surface thereof to screw with the internal threads of the intake 101 of the seat 10*a* to close the intake 101, and includes an internal top wall 138 of the chamber 13 disposed on a bottom end thereof; the internal top wall 138 includes a first spring positioning structure fixed on a central portion thereof, and the first spring positioning structure is selected from a first groove 139 and a first extended post. To screw the covering member 10*b* with or release the covering member 10*b* from the seat 10, an extension 17 is formed on a top end of the body 10 to be rotated by a specific tool to further rotate the covering member 10*b*.

Figure 3:
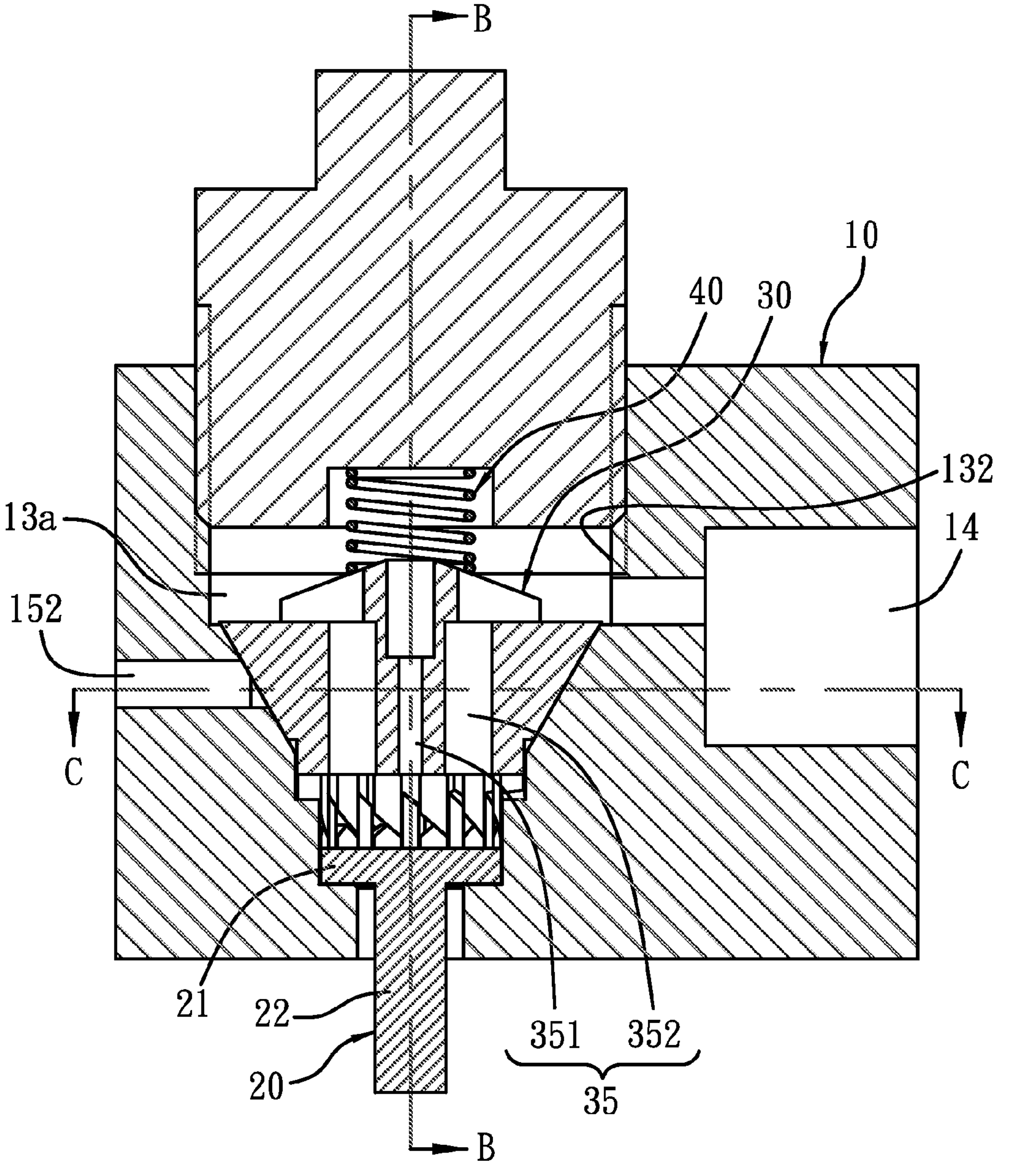
FIG. 3 is a cross sectional view taken along the line A-A of FIG. 1.
Figure 4:
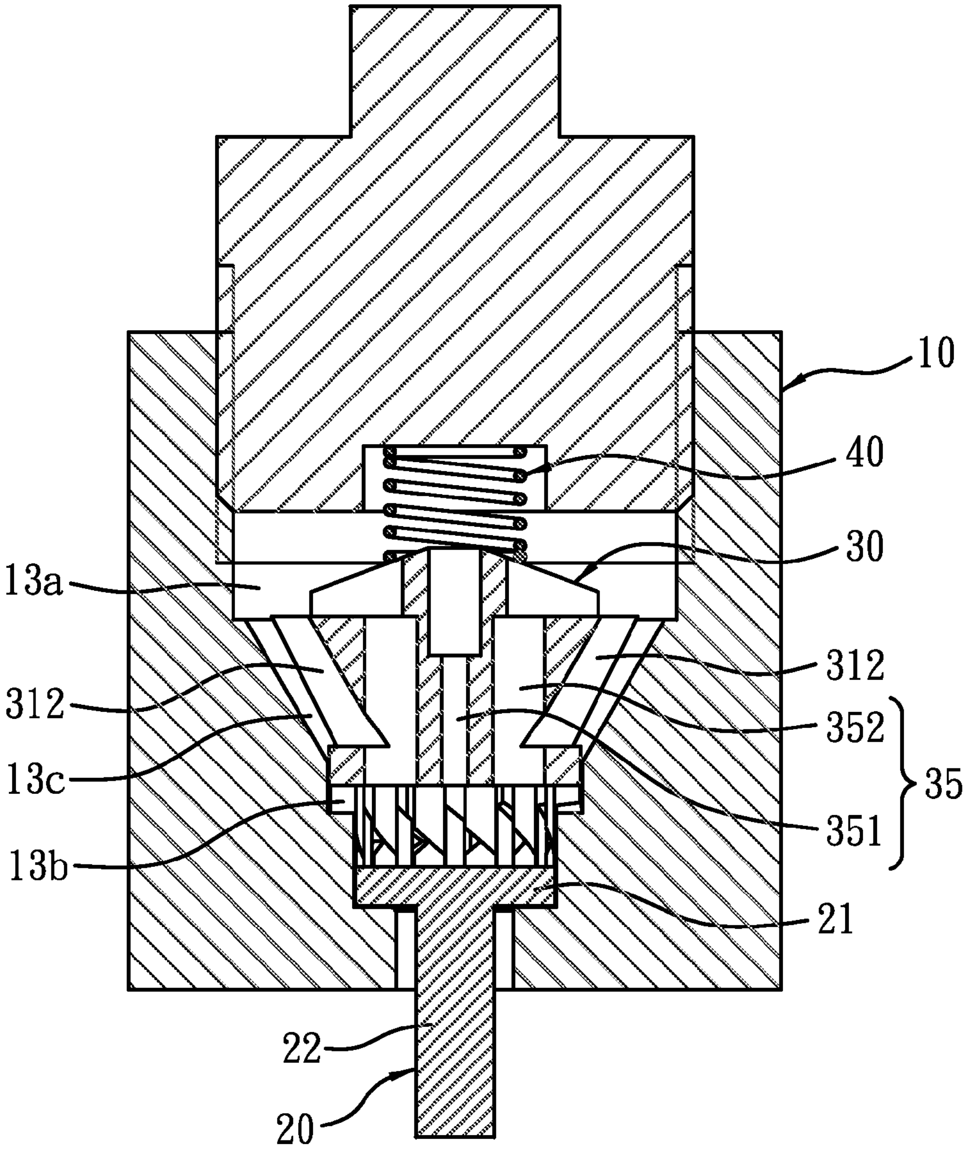
FIG. 4 is a cross sectional view taken along the line B-B of FIG. 3.
Figure 10A:
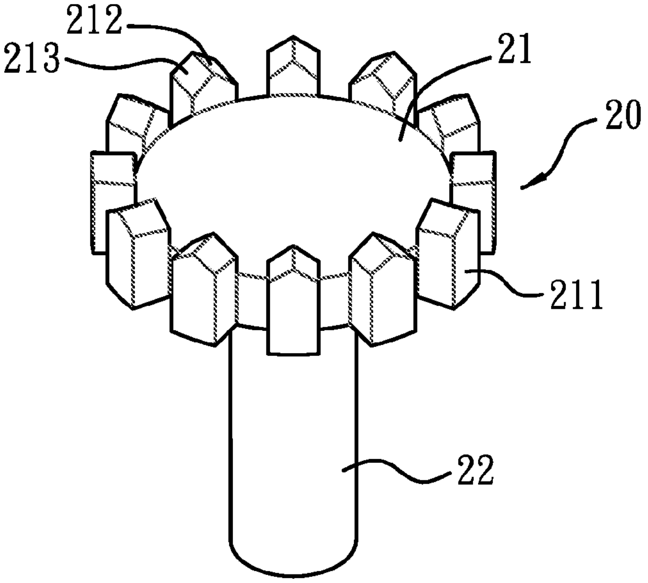
FIG. 10A is a perspective view showing the assembly of a pressing element of the handheld and multi-section water distributor according to the first embodiment of the present invention.
Figure 10B:
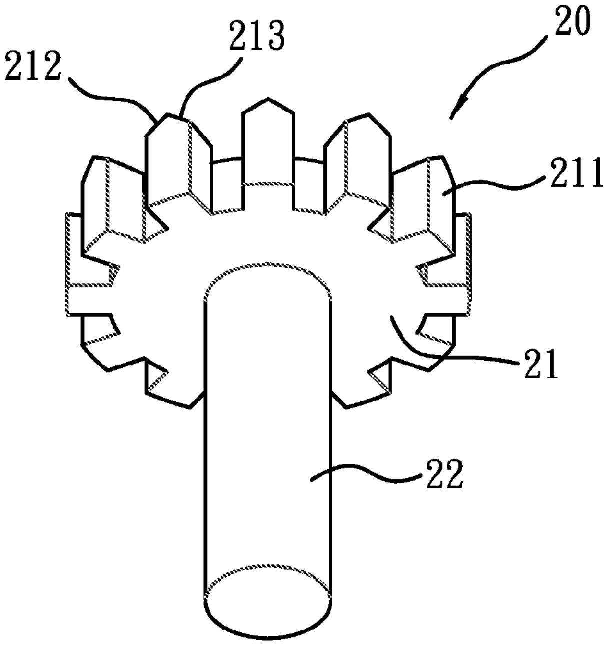
FIG. 10B is another perspective view showing the assembly of the pressing element of the handheld and multi-section water distributor according to the first embodiment of the present invention.

The pressing element 20, as illustrated in FIGS. 10A and 10B, includes a disk-shaped push segment 21, a rod-shaped press segment 22 integrally extending from a central portion of a bottom end of the push segment 21; the push segment 21 is received in the operating room 13*b* of the body 10 to be limited, as shown in FIGS. 3 and 4, the press segment 22 extends out of the operating room 13*b* from the hole 16 of the operating room 13*b* to be pressed by a user.

The push segment 21 includes a plurality of sliding projections 211 radially extending from a peripheral side thereof and spaced apart from each other equally, and there are twelve sliding projections 211 provided in this embodiment to be retained in the recesses 136 respectively, and each sliding projection 211 includes a first inclined face 212 formed on a top end thereof to match with a tilted angle of the ratchet plane 137 of the toothed block 135. In this embodiment, the top end of the sliding projection 211 is formed in a conical tooth shape and includes the first inclined face 212 and a second inclined face 213.

Figure 11A:
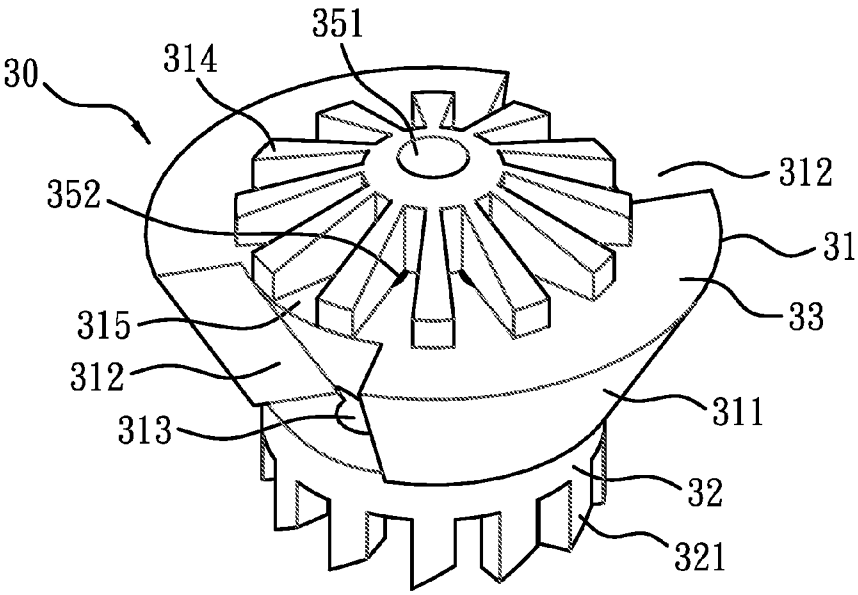
FIG. 11A is a perspective view showing the assembly of a plugging member of the handheld and multi-section water distributor according to the first embodiment of the present invention.
Figure 11B:
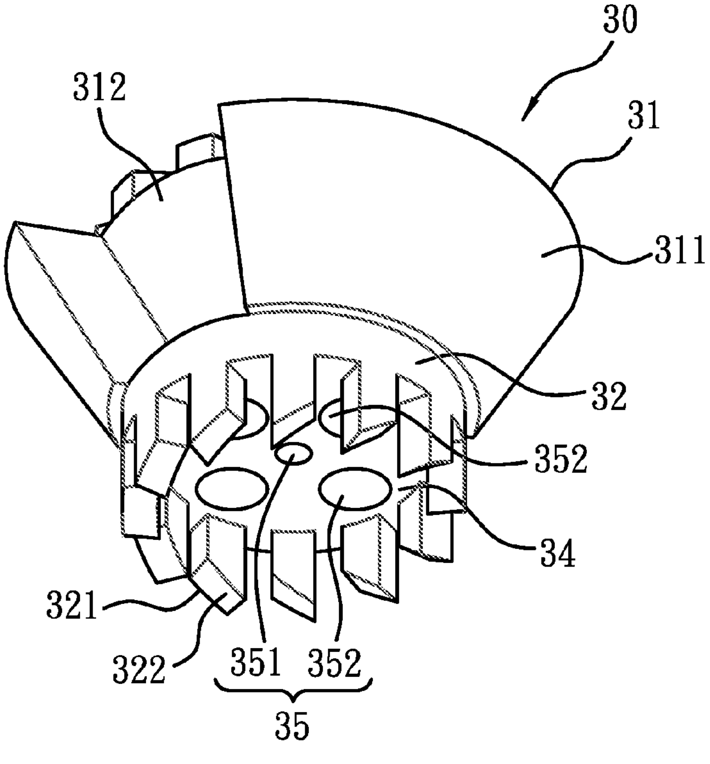
FIG. 11B is another perspective view showing the assembly of the plugging member of the handheld and multi-section water distributor according to the first embodiment of the present invention
Figure 12:
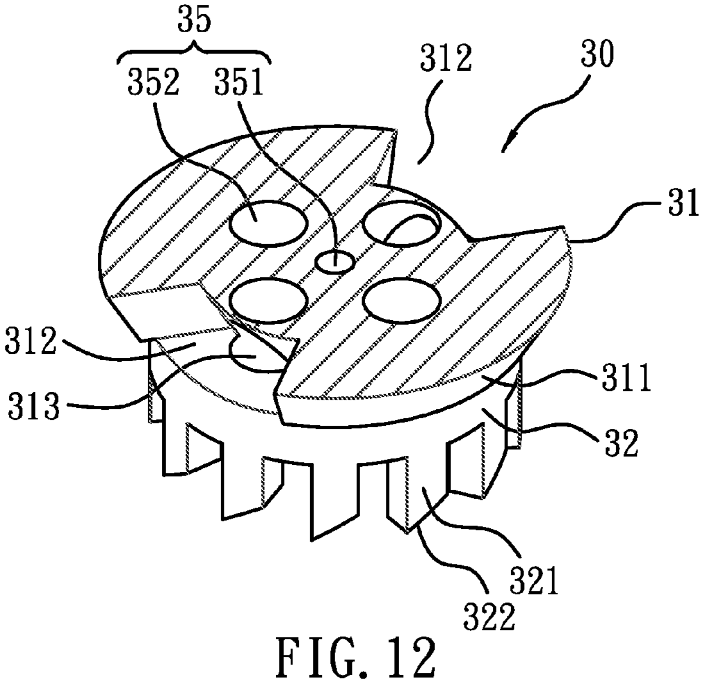
FIG. 12 is a cross-sectional perspective view showing the assembly of the plugging member of the handheld and multi-section water distributor according to the first embodiment of the present invention.
Figure 13:
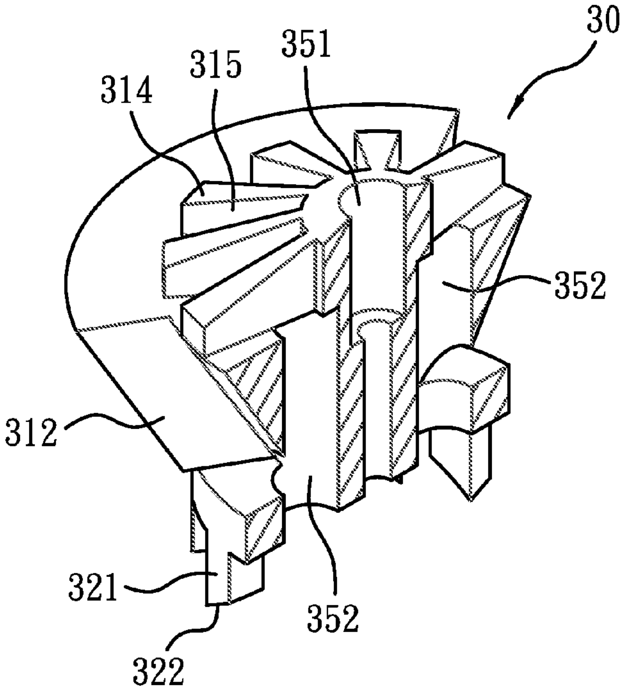
FIG. 13 is another cross-sectional perspective view showing the assembly of the plugging member of the handheld and multi-section water distributor according to the first embodiment of the present invention.

The plugging member 30, as illustrated in FIGS. 11-13, includes an inversely trapezoid plug segment 31, and a retaining segment 32 integrally extending from a bottom end of the plug segment 31.

The plug segment 31 is formed in a cone shape and extends downward decreasingly to define an outer sealing wall 311 to closely engage with the inner sealing wall 131 of the closing room 13*c* of the body 10; the outer sealing wall 311 further includes two flowing tunnels 312 arranged on two opposite sides thereof individually to communicate with the outflow channel 15 of the body 10 as shown in FIG. 5, such that the water in the inflow room 13*a* is guided toward the outflow channel 15.

Between a top fence 33 and a bottom fence 34 of the plugging member 30 are defined a number of orifices 35 to communicate with the inflow room 13*a* of the operating room 13*b*. In this embodiment, there are five orifices 35 provided, and the five orifices include a first orifice 351 located at a central portion between the top and the bottom fences 33, 34 and four second orifices 352 arranged around the first orifice 351 and spaced apart from each other evenly, wherein any two opposite second orifice 352 are located at an inner side of the flowing tunnels 312 and communicate with the flowing tunnels 312 respectively as illustrated in FIGS. 11A and 13 so that on a connection of the second orifice 352 and the lowing tunnel 312 is provided with an aperture 313 so that the second orifice 352 is used to release a pressure as the plugging member 30 moves upward and downward and to flow partial water in the inflow room 13*a* through the aperture 313 and the outflow channel 15 after shifting a rotary positioning process to increase a certain water flow quantity.

The top fence 33 of the plugging member 30 includes a plurality of fan-shaped ribs 314 formed thereon as shown in FIGS. 11A and 13, and between any two adjacent ribs 314 is defined a passage 315 so that the water in the inflow room 13*a* flows toward the operating room 13*b* through the passage 315 and the second orifice 352.

Figure 14:
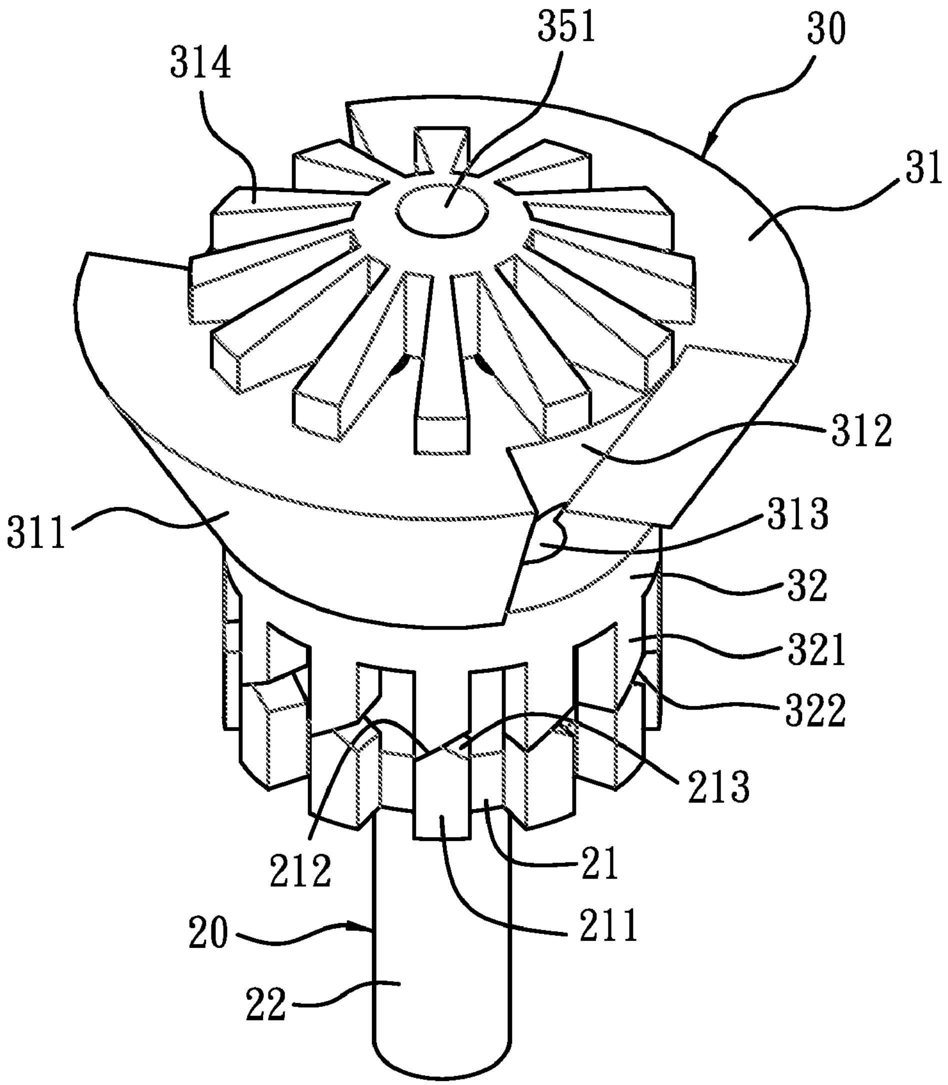
FIG. 14 is a perspective view showing the operation of the pressing element and the plugging member of the handheld and multi-section water distributor according to the first embodiment of the present invention.

The retaining segment 32 includes a number of protrusions 321 arranged around a peripheral side of a bottom end thereof. In this embodiment, there are twelve protrusions 321 provided as illustrated in FIG. 11B to be retained in the recesses 136 of the body 10 respectively, and each protrusion 321 includes a third inclined face 322 disposed on a bottom end thereof to match with the first inclined face 212 of the sliding projection 211 of the pressing element 20 as shown in FIG. 14.

Figure 15A:
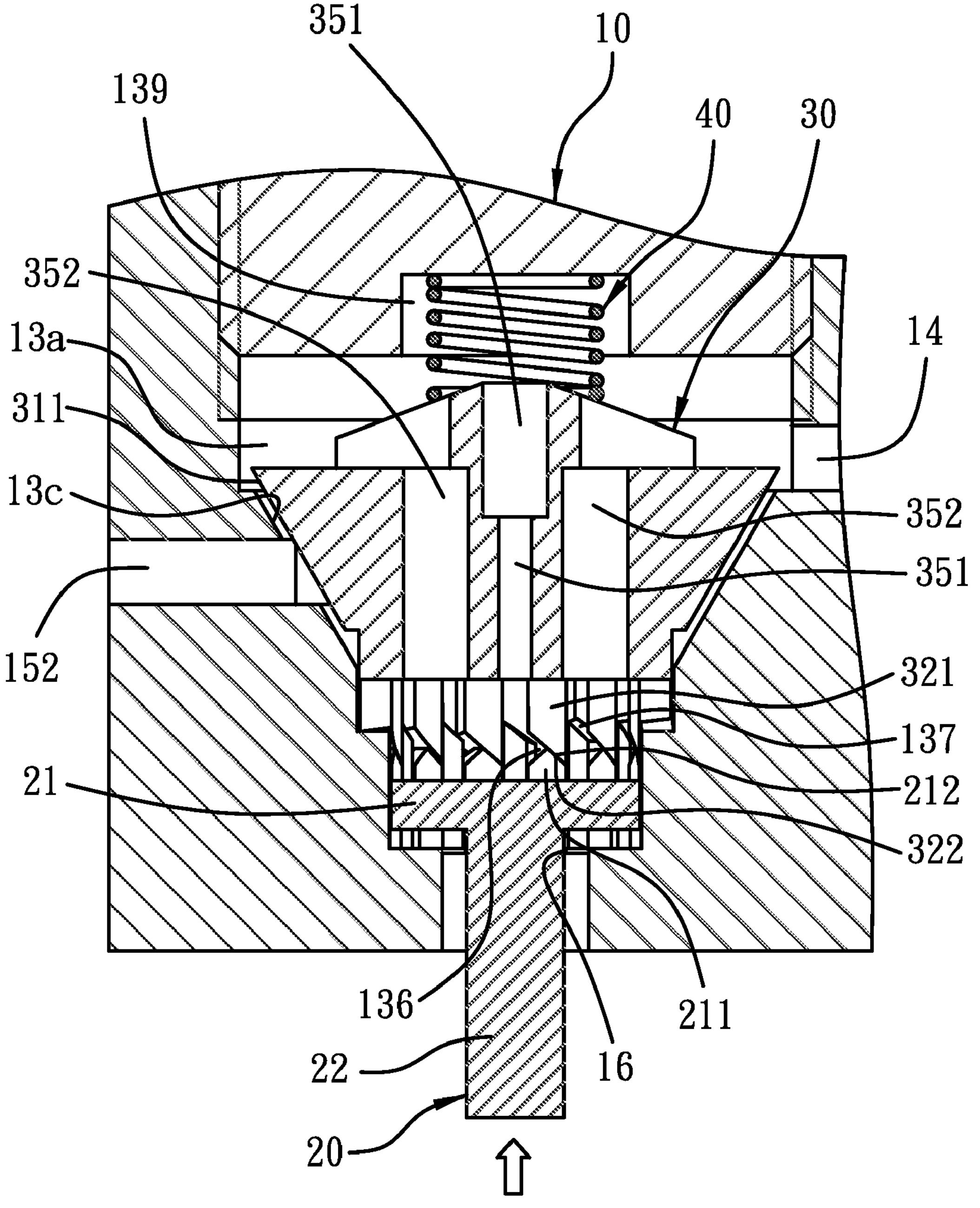
FIG. 15A is a cross sectional view showing the operation of the handheld and multi-section water distributor according to the first embodiment of the present invention.
Figure 15B:
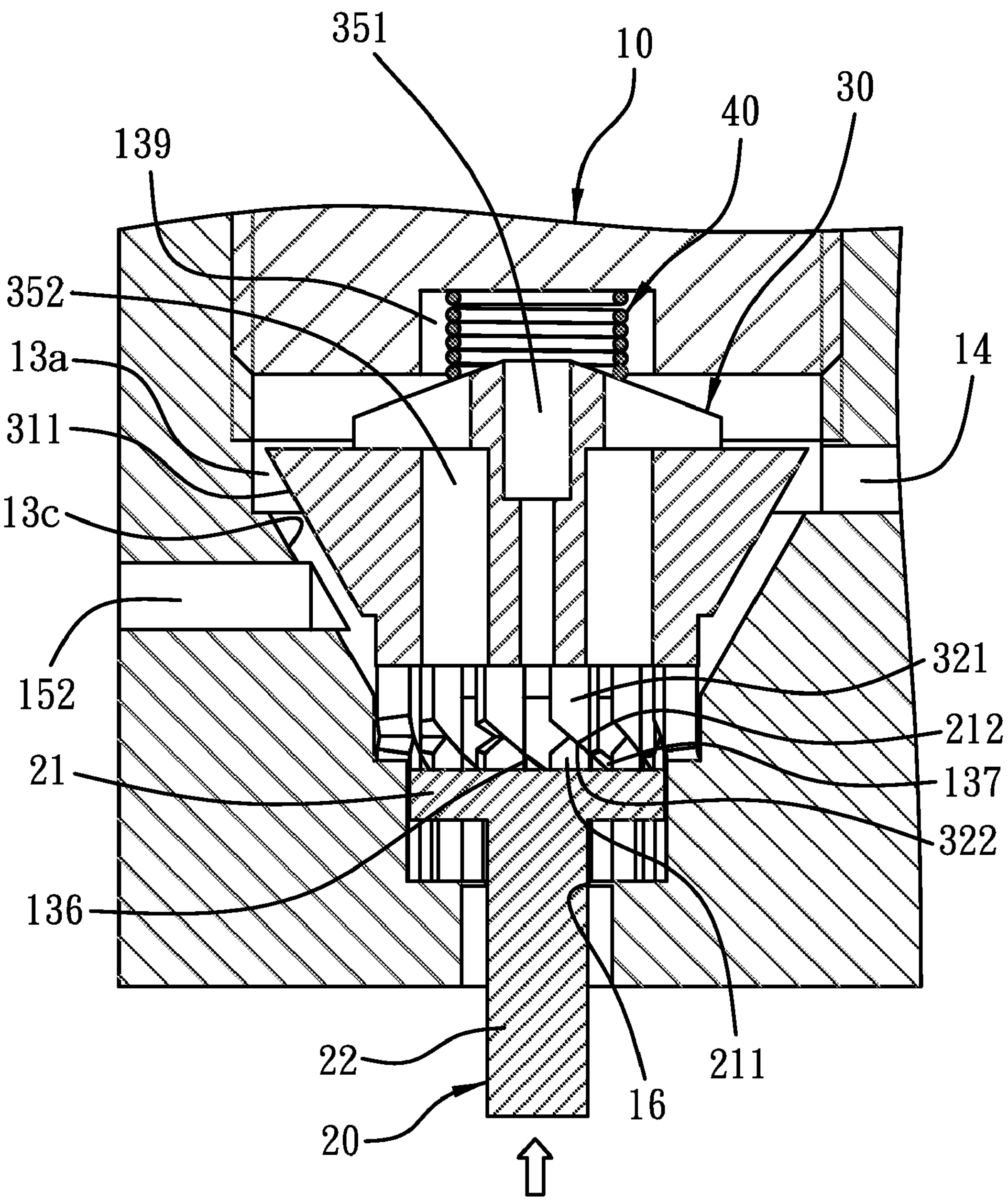
FIG. 15B is another cross sectional view showing the operation of the handheld and multi-section water distributor according to the first embodiment of the present invention.

When the pressing element 20 is pressed to move upward, the protrusions 321 of the pressing element in the recesses 136 are pushed upward by the first inclined faces 322 individually to slide upward along the recesses 136 until they disengage from the recesses 136 as illustrated in FIGS. 15A and 15B, and due to the plugging member 30 is pressed downward, a downward pressing force drives the first inclined faces 322 of the protrusions 321 to rotate and slide along the ratchet planes 137 of the toothed blocks 135, and when the pressing force on the pressing element 20 is released, the sliding projections 211 of the pressing element 20 move downward to return their original positions individually along the recesses 136 until they slide into the recesses 136, thus finishing a rotary positioning operation to shift a water level.

Figure 16A:
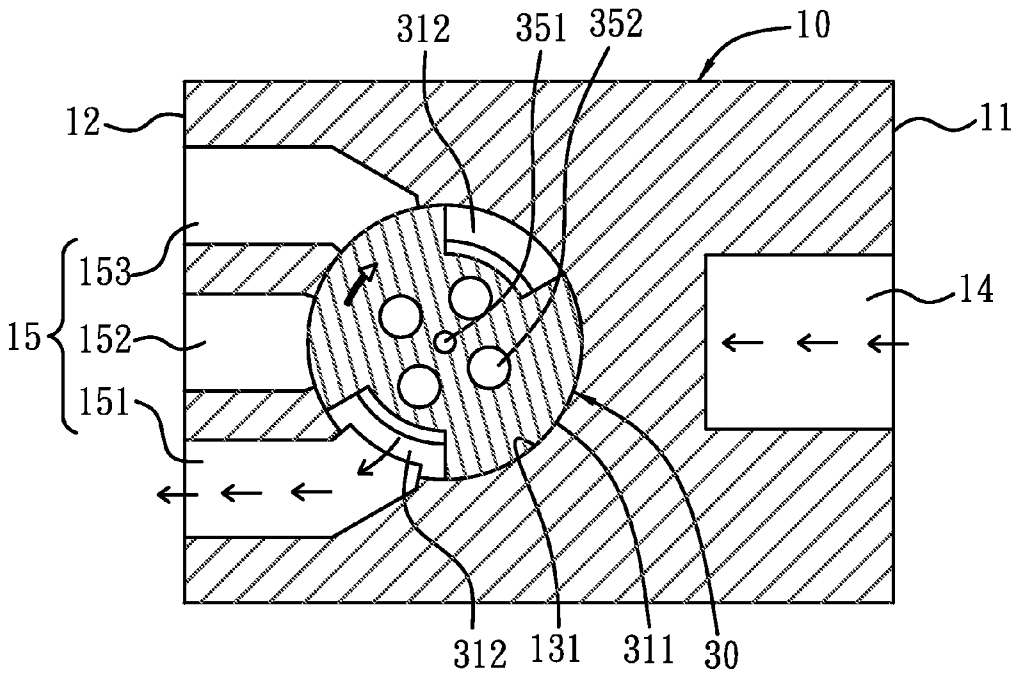
FIG. 16A is a cross sectional view showing the operation of the pressing element of the handheld and multi-section water distributor according to the first embodiment of the present invention.
Figure 16B:
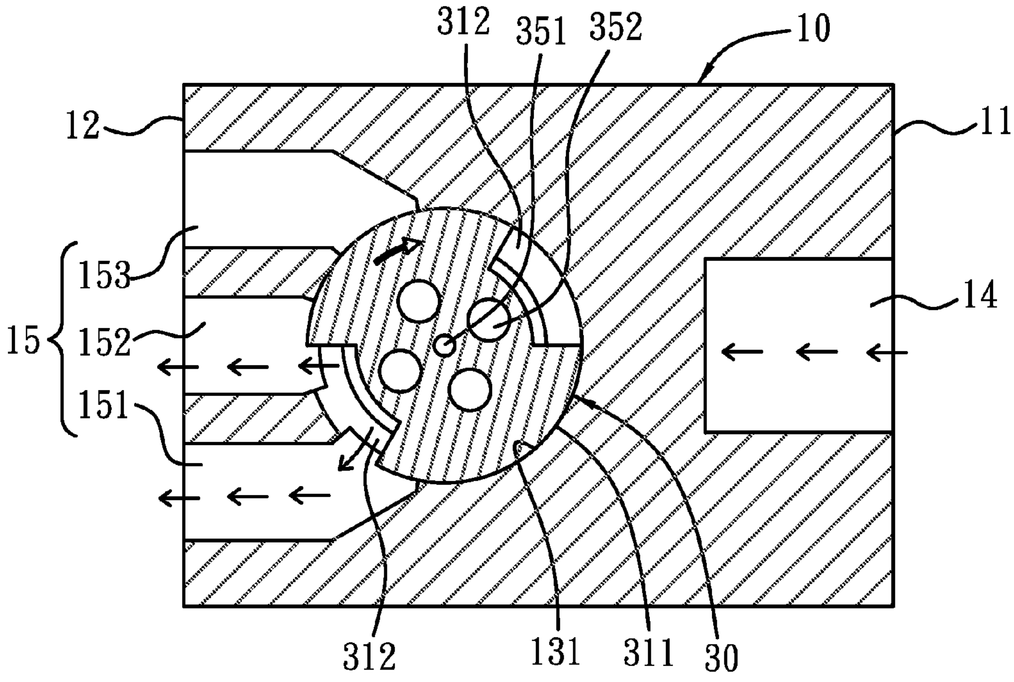
FIG. 16B is another cross sectional view showing the operation of the pressing element of the handheld and multi-section water distributor according to the first embodiment of the present invention.
Figure 16C:
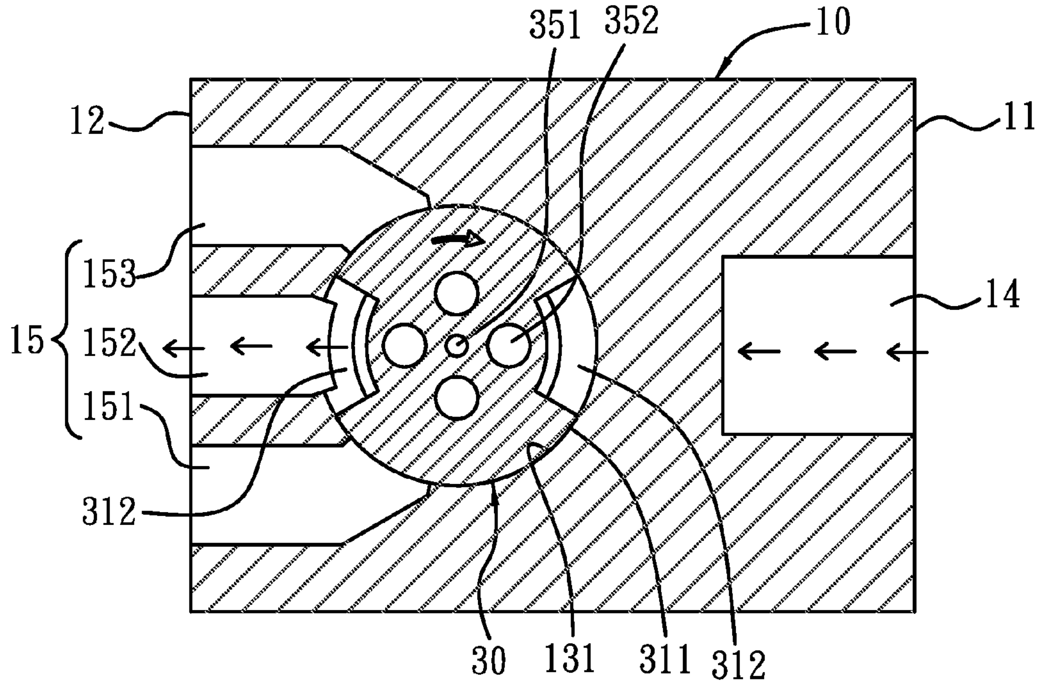
FIG. 16C is another cross sectional view showing the operation of the pressing element of the handheld and multi-section water distributor according to the first embodiment of the present invention.
Figure 16D:
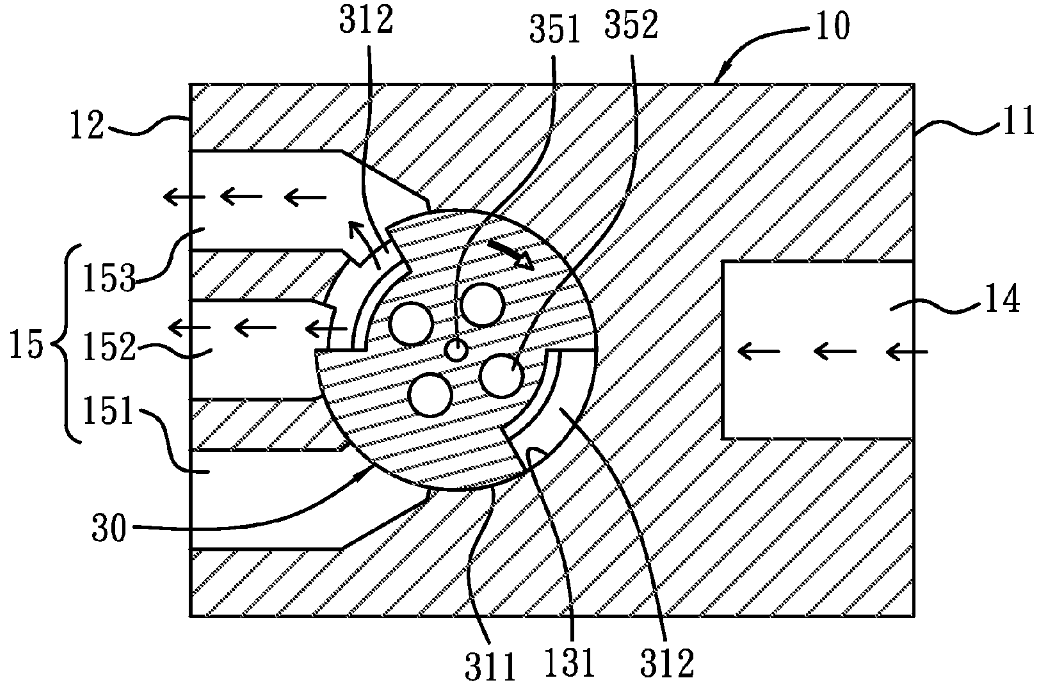
FIG. 16D is also another cross sectional view showing the operation of the pressing element of the handheld and multi-section water distributor according to the first embodiment of the present invention.
Figure 16E:
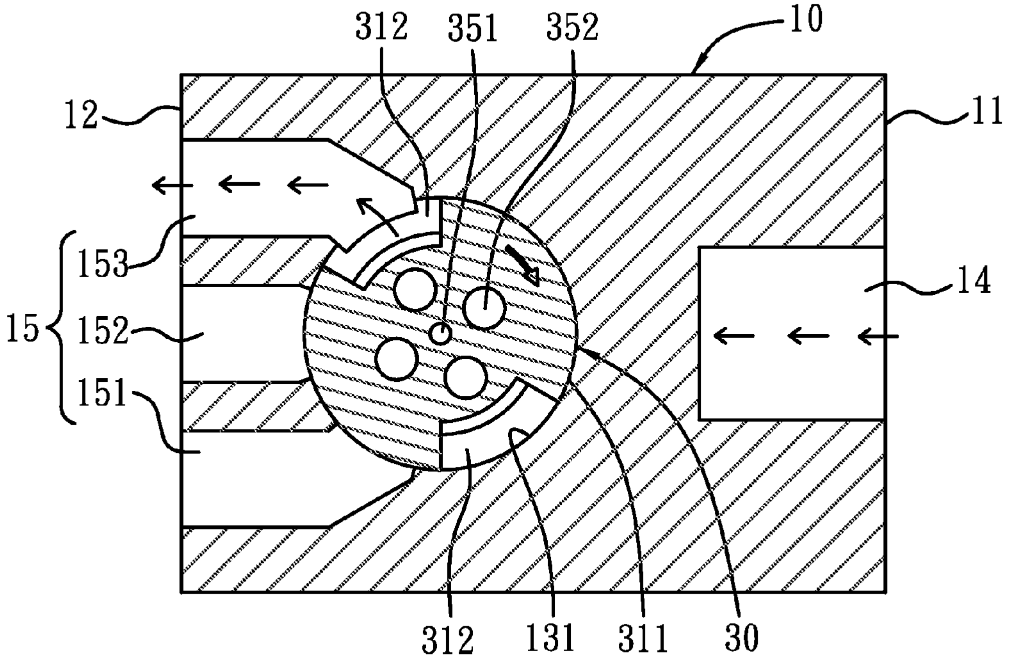
FIG. 16E is still another cross sectional view showing the operation of the pressing element of the handheld and multi-section water distributor according to the first embodiment of the present invention.

Because the plugging member 30 and the body 10 include the twelve protrusions 321 and the twelve recesses 136, when the pressing element 20 is pressed and released every time, the plugging member 30 is driven to rotate 30 degrees as illustrated in FIGS. 16A and 16E, and the flowing tunnels 312 rotate 30 degrees in a certain direction during the rotary positioning operation.

It is to be noted that inclined angles of the ratchet plane 137, the first inclined face 212, and the third inclined face 322 have to be matched with one another, and inclined directions of the ratchet plane 137, the first inclined face 212, and the third inclined face 322 are used to determine a rotary positioning direction of the plugging member 30 when the plugging member 30 is driven. In this embodiment, the plugging member 30 is guided to rotate along a clockwise direction.

Besides, due to an area of the top fence 33 of the plugging member 30 to receive a water flowing pressure of the inflow room 13*a* is larger than that of the bottom fence 34 to receive a water flowing pressure of the operating room 13*b*, and inner water pressures of the inflow room 13*a* and the operating room 13*b* are capable of being kept balanced by ways of the orifices 35, therefore an water-pressure effect forcing on the top end of the plugging member 30 is larger than that forcing on the bottom end of the plugging member 30 so that the plugging member 30 is forced to generate a downward pressing force in a normal state so that the outer sealing wall 311 and the inner sealing wall 131 of the closing room 13*c* engage with each other tightly.

The resilient element 40 is a compression spring in this embodiment, and includes two ends fixed between the groove 139 of the inflow room 13*a* and the top fence 33 of the plugging member 30 so that the resilient element 40 pushes the plugging member 30 downward, and the protrusions 321 disengage from the recesses 136 of the body 10, and then rotably slides into the adjacent recesses 136 along the ratchet planes 137 of the toothed blocks 135 by using an elastic force of the resilient element 40, hence the plugging member 30 is pressed to slide rotably and returns its original position. Furthermore, an action force of the water pressure on the top end of the plugging member 30 is more than that of the water pressure on the bottom end of the plugging member 30 to generate a downward pressing force, thus enhancing a closing effect between the plugging member 30 and the closing room 13*c* of the body 10.

The top fence 33 of the plugging member 30 includes a second spring positioning structure fixed at a position thereof relative to the resilient element 40, and the second spring positioning structure is selected from a second groove 139 and a second extended post to retain the resilient element 40.

In assembly, the pressing element 20, the plugging member 30, and the resilient element 40 are fixed in the chamber 13 from the intake 101 of the body 10, and the covering member 10*b* is screwed to the body 10 to finish the assembly process, wherein the pressing element 20 is fixed downward by ways of the press segment 22 so that the press segment 22 extends out of the hole 16 of the operating room 13*b* to be pressed by the user.

The water distributor 1 in this embodiment is used to various water spray equipments, such as a handheld shower head or a top shower head, accordingly when the water distributor 1 is turned on, the water flows into the inflow room 13*a* via the entering channel 14, wherein as the plugging member 30 is located at a first shifting position as shown in FIG. 5, the water in the inflow room 13*a* flows toward the first outflow channel 151 and the third outflow channel 153 along the flowing tunnels 312, obtaining a first watering mode.

When the user presses and releases the pressing element 20 one time, the plugging member 30 rotates 30 degrees in the clockwise direction to be positioned at a second shifting position, as illustrated in FIG. 16A, and the water in the inflow room 13*a* flows toward the first outflow channel 151 via one of the flowing tunnels 312, thus generating a second watering mode.

Thereby, the user allows to press and release the pressing element 20 one time, and then the plugging member 30 rotates 30 degrees in the clockwise direction to be fixed at a third to a twelfth shifting positions in turn wherein when the plugging member 30 is located at the third shifting position, the water in the inflow room 13*a* flows into the first and the second outflow channels 151, 152 from one of the flowing tunnels 312 to generate a third watering mode as shown in FIG. 16B. As shown in FIG. 16C, when the plugging member 30 is located at a fourth shifting position, the water in the inflow room 13*a* flows into the second outflow channel 152 from one of the flowing tunnels 312 to generate a fourth watering mode. As shown in FIG. 16D, when the plugging member 30 is located at a fifth shifting position, the water in the inflow room 13*a* flows into the second and the third outflow channels 152, 153 from one of the flowing tunnels 312 to obtain a fifth watering mode. As shown in FIG. 16E, when the plugging member 30 is located at a sixth shifting position, the water in the inflow room 13*a* flows into the third outflow channel 153 from one of the flowing tunnels 312 to obtain a sixth watering mode.

It is to be noted that when the plugging member 30 is rotated to fix at a seventh shifting position, because the plugging member 30 has been rotated for 180 degrees, the water in the inflow room 13*a* flows into the first and the third outflow channels 151, 153 along the flowing tunnels 312 to obtain the first watering mode, hence the watering modes at the seventh and the first shifting positions are the same. Likewise, the watering modes at the eighth and the second shifting positions are the same; the watering modes at the ninth and the third shifting positions are the same; the watering modes at the tenth and the fourth shifting positions are the same; the watering modes at the eleventh and the fifth shifting positions are the same; the watering modes at the twelfth and the sixth shifting positions are the same. Thereby, when the pressing element 20 is pressed continuously, the plugging member 30 is positioned from the first shifting position to the twelfth shifting position, and the first to the sixth watering mode are capable of being shifted in turn to obtain a multi-section shifting function so that the user shifts a desired watering mode freely based on requirement.

However, the watering mode with six shifting levels are not limited, e.g., a number of shifting levels are determined based on a rotary positioning angle after the plugging member 30 is pressed and a number of the outflow channels 15, and it is preferable that a separated angle between two central portions of any two adjacent outflow channels 15 is equal to a rotating angle of the plugging member 30 so that when the user presses continuously, the water is controlled to flow out of one or two outflow channels 15 repeatedly.

Thereby, there are at least two outflow channels 15 to be provided in this present invention to achieve a shifting level with at least three watering modes.

Figure 17:
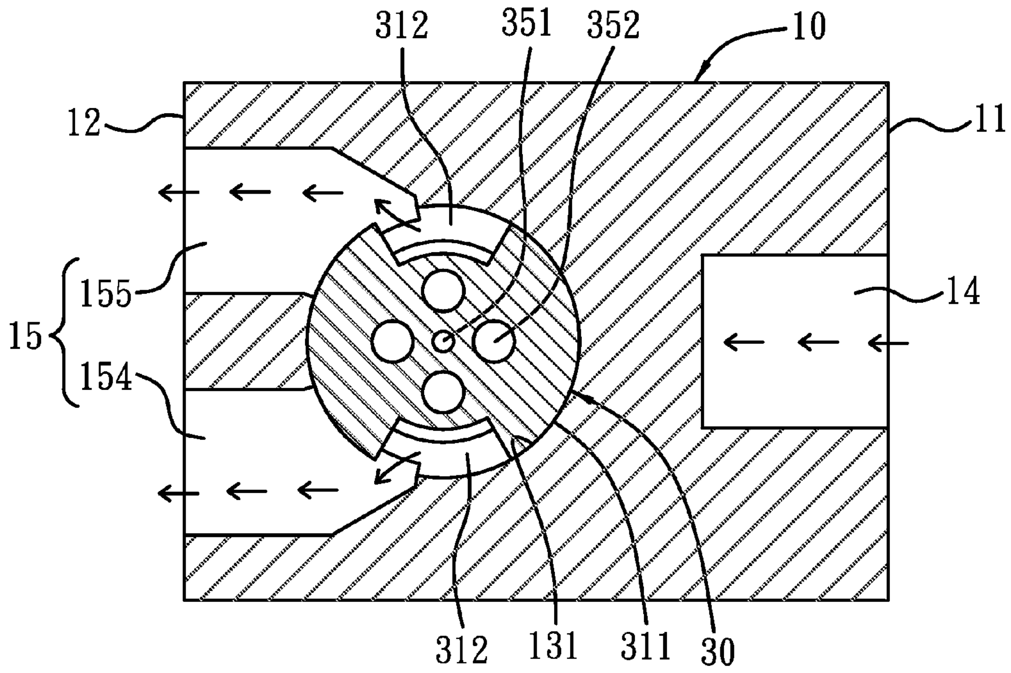
FIG. 17 is a cross sectional view showing the operation of a handheld and multi-section water distributor according to a second embodiment of the present invention.

With reference to FIG. 17, a handheld and multi-section water distributor 1 according to a second embodiment of the present invention comprises three watering modes, wherein a body 10 includes two outflow channels 15, and the two outflow channels 15 are a first outflow channel 154 and a second outflow channel 155, and the plugging member 30 is designed to rotate for 45 degrees, hence when the plugging member 30 is in a certain state as shown in FIG. 17, the water flowing through the plugging member 30 is guided to flow out of the first and the second outflow channels 154, 155 to generate a first watering mode; when the water distributor 1 is pressed first time, water merely allows to flow out of the first outflow channel 154 to form a second watering mode; when the water distributor 1 is pressed second time, the water allows to flow out of the first and second outflow channels 154, 155 to form the first watering mode; and when the water distributor 1 is pressed third time, the water only allows to flow out of the second outflow channel 155 to generate a third watering mode. In addition, when the water distributor 1 is further pressed once more, the watering mode is obtained repeatedly. To keep the plugging member 30 to rotate 45 degrees every time after the water distributor 1 is pressed, wherein a body 10 includes eight recesses 136 provided therein, and the plugging member 30 includes eight protrusions 321 provided therein, a pressing element 20 includes eight sliding projections 211 provided thereon.

Figure 18:
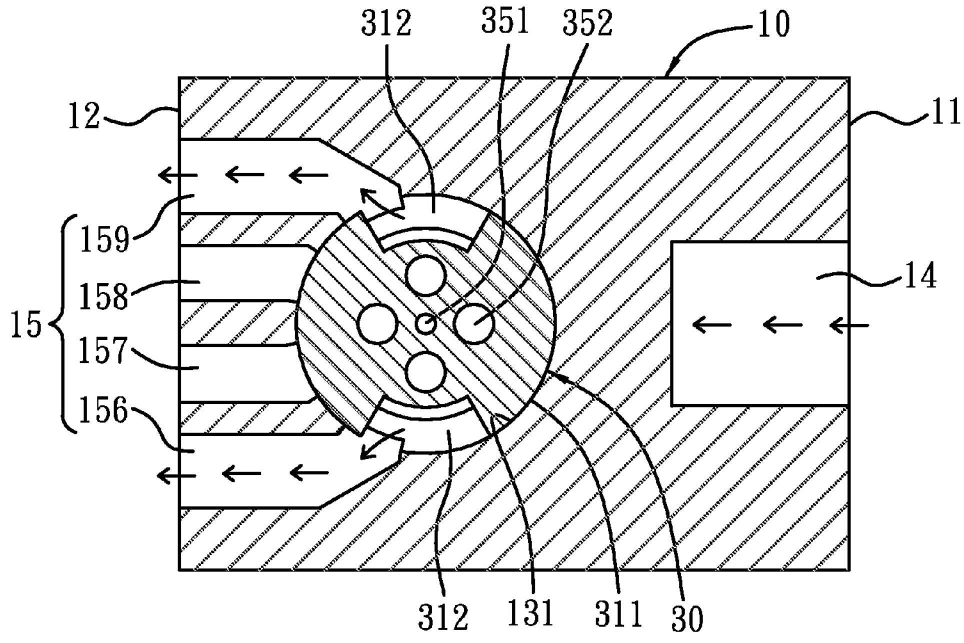
FIG. 18 is a cross sectional view showing the operation of a handheld and multi-section water distributor according to a third embodiment of the present invention.

Referring to FIG. 18, a handheld and multi-section water distributor 1 according to a third embodiment of the present invention comprises three watering modes, wherein a body 10 includes four outflow channels 15 to achieve eight watering modes, i.e., the body 10 includes four outflow channels 15, and the four outflow channels 15 include a first outflow channel 156, a second outflow channel 157, a third outflow channel 158, and a fourth outflow channel 159, and the plugging member 30 is designed to rotate for 22.5 degrees every time, hence when the plugging member 30 is in a certain state as shown in FIG. 18, water flowing through the plugging member 30 is guided to flow out of the first and the fourth outflow channels 158, 159 to generate a first watering mode; when the water distributor 1 is pressed first time, the water merely allows to flow out of the first outflow channel 156 to form a second watering mode; when the water distributor 1 is pressed second time, the water allows to flow out of the first and second outflow channels 156, 157 to form a third watering mode. Also, a fourth to an eighth watering mode is obtained based on above-mentioned method. In addition, when the water distributor 1 is further pressed once more, the above-mentioned watering modes are obtained repeatedly. To keep the plugging member 30 to rotate 22.5 degrees every time after the water distributor 1 is pressed, wherein a body 10 includes sixteen recesses 136 provided therein, and the plugging member 30 includes sixteen protrusions 321 provided therein, a pressing element 20 includes sixteen sliding projections 211 provided thereon. However, when numbers of the recess 136, the protrusion 321, and the sliding projections 211 are increased, a specification and a size of the water distributor 1 are influenced, therefore a strict manufacture standard and an optional number of the shifting level have to be considered carefully.

Of course, a single outflow channel 156 is capable of being applied to simplify the structure of the water distributor, but such a single outflow channel is not an ideal embodiment.

Figure 19:
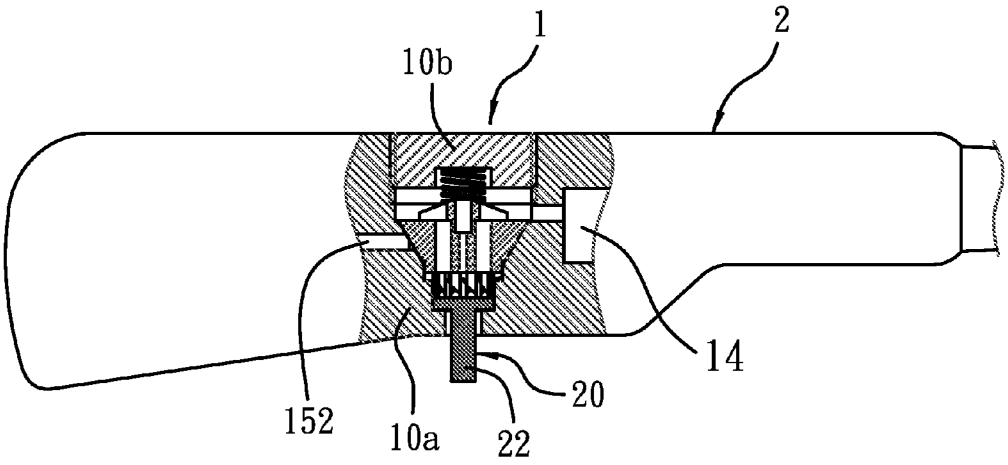
FIG. 19 is a cross sectional view showing a water distributor of a fourth embodiment of the present invention being installed on a handheld shower.

The water distributor 1 of the first embodiment is capable of being changed on a basis of various watering equipments, such as a water distributor 1 according to a fourth embodiment of the present invention, as illustrated in FIG. 19, is installed on a handheld shower 2 and includes a seat 10*a* and a covering member 10*b* different from those of the first embodiment, but a function of the water distributor is not influenced.

Figure 20:
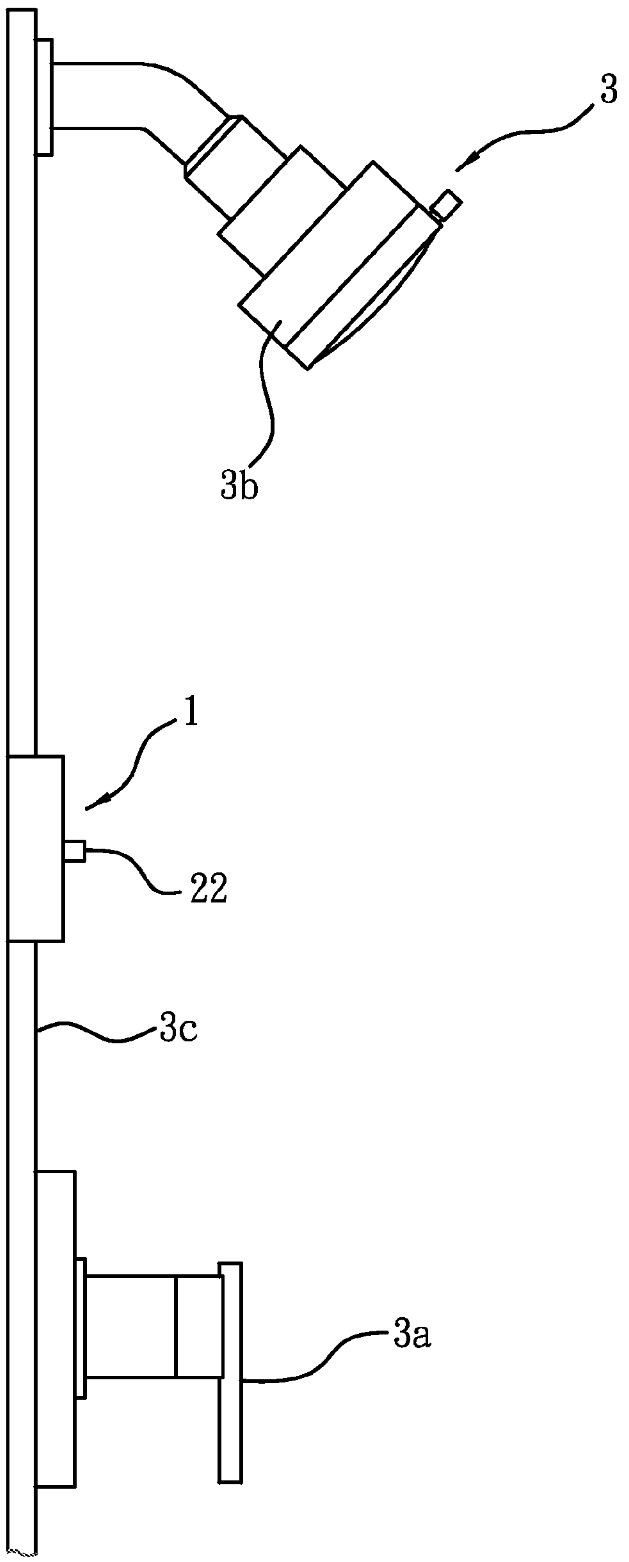
FIG. 20 is a side plan view showing the water distributor of one of the first, the second, the third, and the fourth embodiments of the present invention being installed on a top shower head.

The water distributor 1 allows to be used in a top shower head equipment 3 as shown in FIG. 20, and the top shower head equipment 3 includes a watering controller 3*a*, a shower head 3*b*, and an output pipe 3*c* connected between the watering controller 3*a* and the shower head 3*b*, wherein the water distributor 1 is installed at a suitable position of the output pipe 3*c* so that the watering controller 3*a* is turned on to shift the water distributor 1, thus obtaining a shifting purpose.

Figure 21:
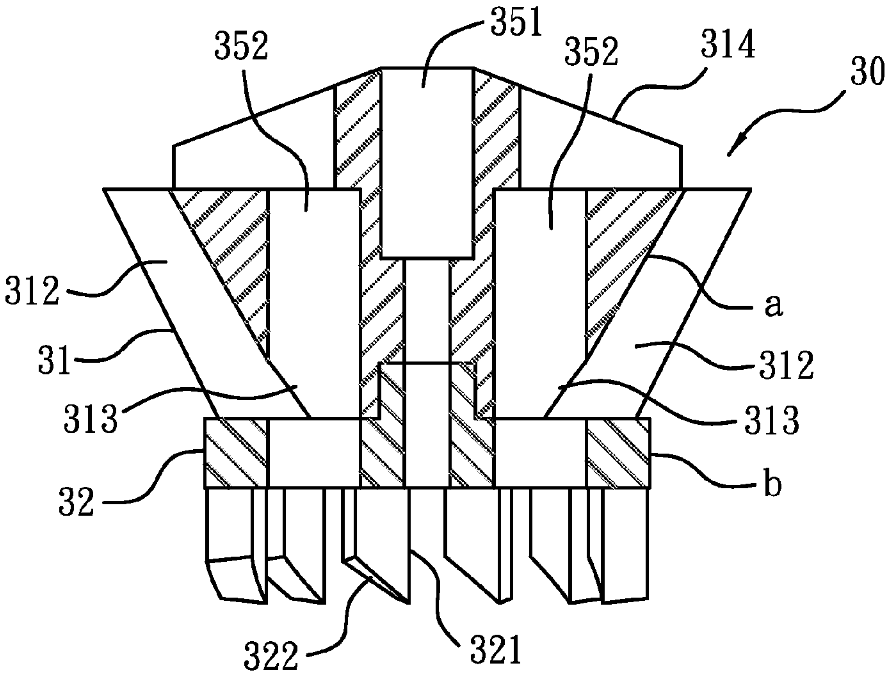
FIG. 21 is a cross-sectional perspective view showing the plugging member of the water distributor of the second embodiment of the present invention being made of a soft rubber material wrapping a hard plastic material.

The plugging member 30 of the first embodiment is made of a signal material, such as a metal or hard plastic material, and the plugging member 30 of the second embodiment, as shown in FIG. 21, is made of a soft rubber material a wrapping a hard plastic material b, wherein due to most part of a plug segment 31 of the plugging member 30 is made of the soft rubber material a, such as an outer sealing wall 311, a closing effect between the outer sealing wall 311 and the closed inner wall 131 of the closing room 13*c* of the body 10. Moreover, the retaining segment 32 is made of the hard plastic material b to slide the protrusions 321 in the recesses 136 and the ratchet planes 137 of the toothed blocks 135 smoothly. Because the ribs 314 are formed on the top fence 33 of the plugging member 30, the flowing tunnels 312 have enough strength to bear a water pressure in the inflow room 13*a* and a pushing force of the resilient element 40 without causing a deformation.

Figure 22:
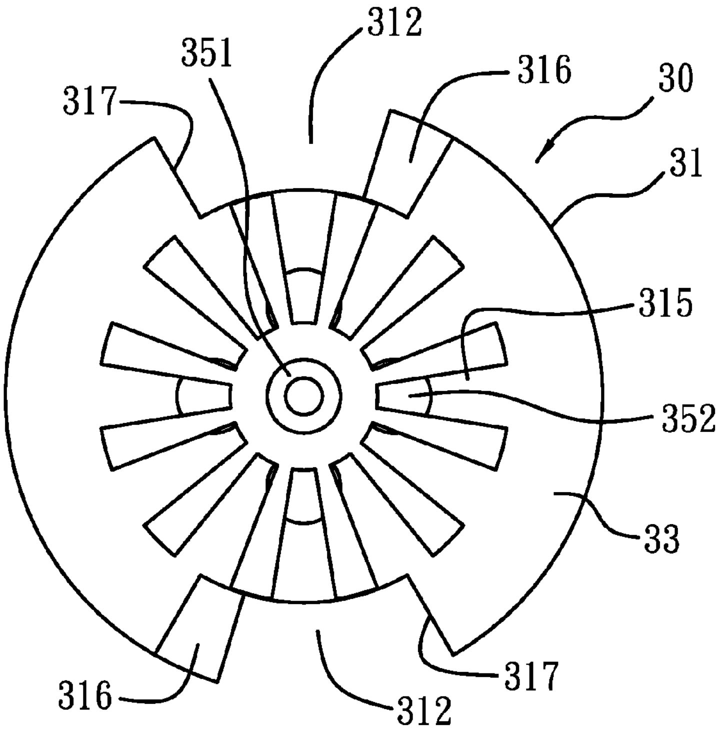
FIG. 22 is a plan view showing the assembly of the plugging member of the third embodiment of the present invention.

The water distributor also includes a tilted face 316 formed on one side of the flowing tunnel 312 according to a rotating direction of the plugging member and a vertical face 317 fixed on another side of the flowing tunnel 312 as illustrated in FIG. 22 so that when the water in the inflow room 13*a* flows downward along the flowing tunnels 312, a pressing force forms on the tilted faces 316 to force the plugging member 30 to move downward and to rotate toward a predetermined direction so that a closing effect between the outer sealing wall 311 of the plugging member 30 and the closed inner wall 131 of the body 10 is enhanced, and a component of rotating force of the plugging member 30 is applied to achieve a shifting effect quickly and stably.

While we have shown and described various embodiments in accordance with the present invention, it is clear to those skilled in the art that further embodiments may be made without departing from the scope of the present invention.

What is claimed is:

1. A handheld and multi-section water distributor comprising a body including an inlet end, an outlet end, and a chamber defined between the inlet end and the outlet end; the chamber including an inflow room disposed on an upper side thereof, an operating room fixed on a lower side thereof, and a closing room defined between the inflow room and the operating room; the closing room being formed in a cone shape and extending downward decreasingly; the inlet end of the body including an entering channel extending toward a first internal face of the inflow room to communicate with the inflow room; the outlet end including at least two outflow channels, each extending toward a closed inner wall of the chamber to communicate with the chamber; a bottom wall of the operating room including a hole disposed thereon so that the operating room communicates with an outer environment through the hole; a second internal face of the operating room including a plurality of toothed blocks extending radially therealong, and between any two adjacent toothed blocks being defined a recess, and each toothed block including a ratchet plane fixed on a top end thereof;

a pressing element including a push segment and a press segment integrally connected on a bottom end of the push segment and extending out of the operating room from the hole of the operating room; the push segment including a plurality of sliding projections radially extending from a peripheral side thereof to be retained in the recesses respectively, and each sliding projection including a first inclined face formed on a top end thereof to match with a tilted angle of the ratchet plane of the toothed block;

a plugging member including a plug segment and a retaining segment integrally extending from a bottom end of the plug segment; the plug segment being formed in a cone shape and extending downward decreasingly to define an outer sealing wall so as to closely engage with the closed inner wall defining an inner sealing wall of the closing room of the body; the outer sealing wall further including at least one flowing tunnel to communicate with at least one of the at least two outflow channels of the body; the retaining segment including a number of protrusions arranged around a peripheral side of a bottom end thereof to be retained in the recesses of the body respectively, and each protrusion including a third inclined face disposed on a bottom end thereof to be pushed by the first inclined face upward so as to disengage from the recess, and then the protrusion rotably sliding into an adjacent recess along the ratchet plane of the toothed block, retaining the protrusion in the recess;

a resilient element fixed between the inflow room and a top fence of the plugging member to push the plugging member.

2. The handheld and multi-section water distributor as claimed in claim 1, wherein the body includes three outflow channels and twelve recesses; the plugging member includes two flowing tunnels arranged on two opposite sides thereof individually and twelve protrusions; the pressing element includes twelve sliding projections, and when the pressing element is pressed upward and released, the plugging member is pushed to rotate 30 degrees toward a predetermined direction.

3. The handheld and multi-section water distributor as claimed in claim 2, wherein the plugging member is capable of being shifted at a first shifting position to a twelfth shifting position to be rotably positioned repeatedly; wherein when the plugging member is located at the first and a seventh shifting positions, the flowing tunnels partially align with a first and a second outflow channel of the three outflow channels to generate a first watering mode; when the plugging member is located at a second and an eighth shifting positions, one of the flowing tunnels completely aligns with the first outflow channel to generate a second watering mode; when the plugging member is located at a third and a ninth shifting positions, the flowing tunnels partially align with the first and the second outflow channels to generate a third watering mode; when the plugging member is located at a fourth and a tenth shifting positions, one of the flowing tunnels completely aligns with the second outflow channel to generate a fourth watering mode; when the plugging member is located at a fifth and an eleventh shifting positions, the flowing tunnels partially align with the second and the third outflow channel to generate a fifth watering mode; when the plugging member is located at a sixth and the twelfth shifting positions, one of the flowing tunnels completely aligns with the third outflow channel to generate a sixth watering mode.

4. The handheld and multi-section water distributor as claimed in claim 2, wherein the plugging member includes five orifices, the five orifices comprising a first orifice located at a central portion thereof and four second orifices arranged around the first orifice and spaced apart from each other evenly.

5. The handheld and multi-section water distributor as claimed in claim 4, wherein any two opposite second orifices are located at an inner side of the flowing tunnels and communicate with the flowing tunnels respectively.

6. The handheld and multi-section water distributor as claimed in claim 5, wherein the top fence of the plugging member includes a plurality of fan-shaped ribs formed thereon, and between any two adjacent ribs is defined a passage, and some of the passages communicate with the second orifices.

7. The handheld and multi-section water distributor as claimed in claim 1, wherein the plugging member includes five orifices, the five orifices comprising a first orifice located at a central portion thereof and four second orifices arranged around the first orifice and spaced apart from each other evenly.

8. The handheld and multi-section water distributor as claimed in claim 7, wherein the top fence of the plugging member includes a plurality of fan-shaped ribs formed thereon, and between any two adjacent ribs is defined a passage, and some of the passages communicate with the second orifices.

9. The handheld and multi-section water distributor as claimed in claim 1, wherein the resilient element is a compression spring.

10. The handheld and multi-section water distributor as claimed in claim 9, wherein the inflow room of the body includes an internal top wall, and wherein the internal top wall includes a first spring positioning structure fixed on a central portion thereof, and the top fence of the plugging member includes a second spring positioning structure fixed at a position thereof relative to position two ends of the compression spring.

11. The handheld and multi-section water distributor as claimed in claim 1, wherein the body is comprised of a seat and a covering member; the seat includes an intake to receive the pressing element, the plugging member, and the resilient element; the covering member is used to close the intake and includes an internal top wall of the chamber disposed on a bottom end thereof.

12. The handheld and multi-section water distributor as claimed in claim 1, wherein the at least one flowing tunnel includes a tilted face formed on one side thereof and a vertical face fixed on another side thereof; the titled face is used to bear water flowing downward from the inflow room.

13. The handheld and multi-section water distributor as claimed in claim 1, wherein a top end of each of the sliding projections is formed in a conical tooth shape and includes the first inclined face and a second inclined face.

14. The handheld and multi-section water distributor as claimed in claim 1, wherein the outer sealing wall of the plugging member is made of a soft rubber material, and the protrusions are made of a hard plastic material.

15. The handheld and multi-section water distributor as claimed in claim 14, wherein the plugging member is made of a soft rubber material wrapping a hard plastic material, wherein one part of the soft rubber material forms the outer sealing wall, and the hard plastic material forms the protrusions.

16. The handheld and multi-section water distributor as claimed in claim 1, wherein the body includes two outflow channels and eight recesses; the plugging member includes two flowing tunnels arranged on two opposite sides thereof individually and eight protrusions; the pressing element includes eight sliding projections provided thereon, such that every time when the pressing element is pressed upward and released, the plugging member is pushed to rotate 45 degrees toward a predetermined direction.

17. The handheld and multi-section water distributor as claimed in claim 1, wherein the body includes four outflow channels and sixteen recesses; the plugging member includes two flowing tunnels arranged on two opposite sides thereof individually and sixteen protrusions; the pressing element includes sixteen sliding projections provided thereon, such that every time when the pressing element is pressed upward and released, the plugging member is pushed to rotate 22.5 degrees toward a predetermined direction.

* * * * *